United States Patent [19]

Buchschmid et al.

[11] Patent Number: 4,652,818
[45] Date of Patent: Mar. 24, 1987

[54] ELECTRICAL MEASURING INSTRUMENT WITH CONNECTING CABLE

[75] Inventors: Emil Buchschmid, Rosstal; Anton Frenznick, Nuremberg; Klaus Neidhard, Wendelstein; Gerhard Robl, Echental-Eschenau, all of Fed. Rep. of Germany

[73] Assignee: Robert Bosch GmbH, Stuttgart, Fed. Rep. of Germany

[21] Appl. No.: 717,232

[22] PCT Filed: Jul. 24, 1984

[86] PCT No.: PCT/DE84/00154
 § 371 Date: Mar. 6, 1985
 § 102(e) Date: Mar. 6, 1985

[87] PCT Pub. No.: WO85/01112
 PCT Pub. Date: Mar. 14, 1985

[30] Foreign Application Priority Data

Sep. 2, 1983 [DE] Fed. Rep. of Germany ....... 3331723

[51] Int. Cl.⁴ ..................... G01P 1/02; G01P 3/488
[52] U.S. Cl. ............................ 324/174; 310/168; 339/147 R
[58] Field of Search ............ 339/94 A, 94 R, 94 M, 339/126 R, 125 R, 256 S, 147 R, 256 R; 324/167, 179, 173, 174; 310/168

[56] References Cited

U.S. PATENT DOCUMENTS 2,891,103 6/1959 Swengel .................. 339/94 A
3,041,483 6/1962 Ebbinghaus .
3,793,545 2/1974 Leiber ..................... 310/168

FOREIGN PATENT DOCUMENTS 2243331 3/1974 Fed. Rep. of Germany .
2606845 8/1977 Fed. Rep. of Germany .
2128827 10/1972 France .
2049308 12/1980 United Kingdom ............ 339/94 R Primary Examiner—Reinhard J. Eisenzopf
Assistant Examiner—Jose M. Solis
Attorney, Agent, or Firm—Frishauf, Holtz, Goodman & Woodward

[57] ABSTRACT

The invention concerns an electric measuring instrument with a connecting cable, preferably an inductive bar sensor for measuring the speed of rotating bodies, which emits electric signals in relation to the rotational speed of the body. To allow that the manufacturing and testing of the measuring instrument (10) can be carried out as economically as possible, the measuring device preferably consists of two prefabricated components (27, 28) joined in such a way that they are interlocking and moisture-proof, namely the actual measuring device consisting of a coil (13), a coil form (14), a permanent magnet (17), a flow conductor piece (15), a pole shoe (16), conductor rails (18) and a housing (20), and a connector piece (25) embedding the end of the connecting cable (22) with the conductor ends (23). Such measuring instruments (10) can be used in motor vehicles or in industry, as temperature probes, pressure sensors, rotational speed sensors or speed sensors for rotating bodies, etc.

6 Claims, 2 Drawing Figures

ELECTRICAL MEASURING INSTRUMENT WITH CONNECTING CABLE

The invention relates to an electric measuring instrument with a connecting cable.

BACKGROUND

In a known bar sensor as a measuring instrument, the electric coil is wound on a coil form in which a flow conductor piece with a permanent magnet has been inserted (DE-PS No. 24 10 630). At the forward face of the bar sensor is a pole shoe which interacts with a revolving sprocket ring on a wheel, to measure the driving speed of a motor vehicle. The electrical connection of the coil is made via two conductor rails at whose one end there is contact with a coil connection, and at whose other end there is contact with a conductor strand of a connector cable. The connecting end of the cable and of the other bar sensor components is spray-coated with plastic. The disadvantage of such solutions is that all functionally important tests of the measuring device, such as measuring the signal voltage, the coil resistance, the insulation test, and the dimensions of the sensor, can only be made when the connecting cable is already connected with the conductor rails. Because of this, the sensor is very difficult to handle in the course of manufacturing as well as in testing. Thus all the testing and manufacturing processes cannot be fully automated.

The present solution is an attempt to perform all manufacturing stages and all functionally important tests of the measuring device as automatically as possible, without being obstructed by the connecting cable.

THE INVENTION

The measuring instrument according to the invention has the advantage that the manufacturing as well as functional testing of all essential parts of the measuring instrument can be carried out without connecting cables, and therefore automatically. It is also considered an advantage that the essential parts of the measuring device can be assembled as a prefabricated component only after the functional tests in a final manufacturing stage, together with the connector piece—including the connecting cable end—which forms another component.

It is particularly advantageous if—after contacting the conductor ends of the connector piece with the conductor rails—the two prefabricated components of the measuring instrument are joined by a flange of the housing in such a way that they are interlocking and moisture-proof. It is practical to fold the conductor rails—whose end contacting the connector piece is projecting from the housing when extended—when the two components are joined.

DRAWING

An embodiment of the invention is shown in the drawing and described in detail below.

FIG. 1 shows a bar sensor as a measuring instrument according to the invention, in cross-section, before the two components are joined, and FIG. 2 shows the completed bar sensor formed by joining the components by means of a flange.

DETAILED DESCRIPTION

Figure 1:
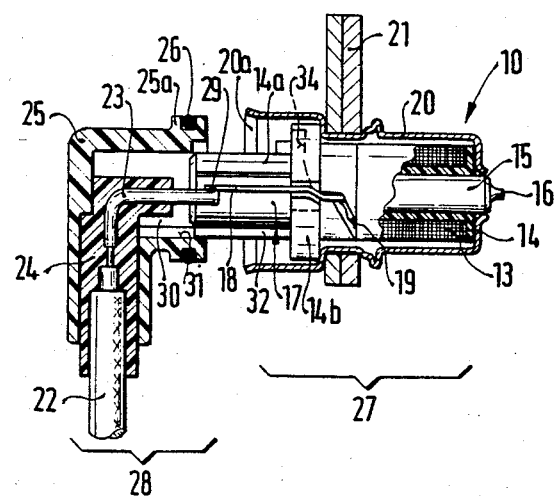
Figure 2:
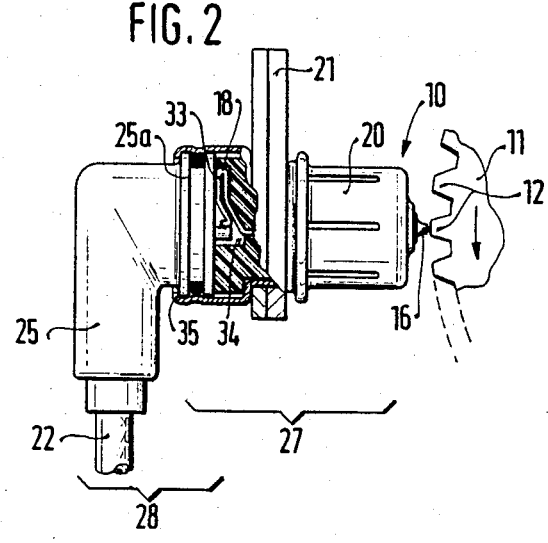

In the figures, a bar sensor for measuring the rotational speed of a motor vehicle wheel (not shown) is identified as number 10. This bar sensor 10 interacts with a sprocket ring (11) fastened to the wheel and rotating in the direction of the arrow; FIG. 2 shows only a fragment of this sprocket ring with a few teeth (12). The bar sensor (10) shown in FIG. 1 in cross-section before the final assembly is made has an electric coil (13) on a coil form (14). Inside this coil 13, in an associated opening of coil form 14, a flow conductor piece (15) has been inserted whose forward end at the forward face of the bar sensor (10) holds a tooth-shaped pole shoe (16). At the rear face of the flow conductor piece (15) which is made of soft magnetic material is a permanent magnet (17) made of hard magnetic material; the surfaces of permanent magnet 17 and of flow conductor piece 15 facing each other are mating over a large area. Permanent magnet 17 interlocks with an upper portion (14a) of coil form 14. This portion (14a) of coil form 14 also holds two conductor rails (18), although only the forward rail is shown in the figures. Each conductor rail (18) is in contact with one end of coil 13 situated in a groove (19) of coil form 14. Coil form 14 with coil 13 and conductor rails 18 is inserted in a metal housing (20) which is welded together with these in the front at an opening in the vicinity of pole shoe 16. The middle portion of metal housing 20 is soldered to a fastening plate (21), and on the side turned away from pole shoe 16 the housing has an open rim (20a).

Furthermore, the end of a flexible, two-conductor connecting cable (22) has its conductor strands welded to a rectangularly bent solid wire (23) forming a conductor end; it is surrounded by a sprayed, moisture-proof plastic casing (24) which in turn is encased by a plastic connector piece (25). At its end facing metal housing 20, a connector piece 25 has a reinforced rim (25a) which carries a gasket (26) in a groove. In extended position, the free end of the conductor rails projects from metal housing 20. The free ends of the two solid wires (23) project from connector piece 25 in the same manner.

Coil 13, coil form 14, permanent magnet 17, flow conductor piece 15, pole shoe 16, conductor rails 18 and metal housing 20 with fastening plate 21 form a single component (27) that is prefabricated by machine. Another component (28) is formed by connector piece 25 in which the end of connecting cable 22 is embedded, by the two solid wires (23) and the plastic casing (24). After checking all functionally important data of component 27, for example the signal voltage, the coil resistance, the insulation of the metal housing (20), and the measurements of the assembly, especially the length, each conductor rail is contacted at its free end with a free end of the solid wires (23) of connector piece 25 by means of a welding (29). Both components, 27 and 28, now assume a position as indicated in FIG. 1; the forward portion (14a) of coil form 14 with permanent magnet 17 engages only at the front in an associated opening (30) of connector piece 25. Through a slot (31) in opening 30 and an associated strip (32) of the coil form (14) inside it, components 27 and 28 are held in a position that is predetermined for contacting. Furthermore, the length of the solid wires (23) and of the conductor rails (18) ensures that the welding (29) is accessible for inserting welding electrodes.

After contacting, the two components 27 and 28 are joined; the forward part (14a) of the coil form (14) is inserted into opening 30 of connector piece 35 until the rim (25a) of the connector piece (25) comes to rest on a shoulder (14b) of coil form 14. Both components (27 and 28) are held in their predetermined position by slot 31 and the strip (32) inside it. When the two components (27 and 28) are joined, each of the conductor rails (18) is folded. The resulting fold (33) of the conductor rails (18) thus enters a pocket (34) that is formed in the shoulder (14b) of the coil form (14).

FIG. 2 shows—partly in cross-section—bar sensor 20 with the two joined components 27 and 28. After contacting the wire ends of the connector piece (25) with the conductor rails (18), the two telescoped components 27 and 28 are joined through a flange (35) of housing rim 20a surrounding rim 25a of connector piece 25 in such a way that the joint is interlocking and moisture-proof.

In the same manner, temperature probes, pressure sensors, rotational speed sensors with semiconductor elements or thin-film elements, etc. can according to the invention be divided into two prefabricated components, with the actual measuring device forming one component that can be manufactured and tested without being obstructed by the connecting cable.

What is claimed is:

1. A vibration- and moisture-resistant inductive sensor construction, particularly for use in vehicles, comprising
   first (27) and second (28) interlocking components, wherein said first component (27) is an electrical measuring instrument having
   a housing (20);
   a pole shoe (16) projecting from the housing;
   a low magnetic flux reluctance element (15) disposed in the housing in contact with said pole shoe (16);
   a coil (13) wound on a coil form (14) surrounding said low magnetic flux reluctance element (15), a permanent magnet (17),
   and a plurality of conductor rails (18) mounted in said housing (20), said conductor rails (18) having free ends projecting from the housing (20); and
   wherein said second component (28) is a measurement signal transmission element having
   a connecting cable (22) having first and second ends,
   a connector piece (25) embedding the first end of the connecting cable (22);
   a plurality of free conductor ends (23) extending from said first end of said connecting cable (22);
   said first (27) and second (28) interlocking elements being joined at a foldable junction, said free ends of said conductor rails (18) folding against and being galvanically connected to said free ends (23) of said connecting cable (22).

2. Sensor construction according to claim 1, characterized in that after contacting the free conductor ends (23) of the connector piece (25) with the free ends of the conductor rails (18), the two components 27 and 28 are joined through a flange (34) of the housing (20) surrounding the rim (25a) of the connector piece (25).

3. Sensor construction according to claim 2, characterized in that the rim (25a) of the connector piece (25) that is flanged by the housing (20) is holding a gasket (26).

4. Sensor construction according to claim 1, characterized in that the free ends of the solid wires (23) project from the connector piece (25).

5. Sensor construction according to claim 4, characterized in that each fold (33) of the conductor rails (18) lies inside a pocket (34) formed at the coil form (14).

6. Measuring instrument according to claim 5, characterized in that both components (27, 28) are axially telescoped in a position predetermined for contacting and folding the conductor rails (18), namely by means of a slot (31) in one component (28) and an associated strip (32) in the other component (27).

* * * * *